United States Patent [19]

Jones et al.

[11] Patent Number: 5,465,636

[45] Date of Patent: Nov. 14, 1995

[54] DEPRESSED PARK WINDSHIELD WIPER MECHANISM

[75] Inventors: Christopher H. Jones, Dayton; Lloyd L. R. Kuck, Beavercreek, both of Ohio; Frank R. Lombardo, Rochester, N.Y.

[73] Assignee: ITT Automotive Electrical Systems Inc., Auburn Hills, Mich.

[21] Appl. No.: 306,234

[22] Filed: Sep. 14, 1994

Related U.S. Application Data

[63] Continuation of Ser. No. 88,465, Jul. 7, 1993, Pat. No. 5,388,482.

[51] Int. Cl.⁶ .............................. B60S 1/24; F16H 21/20
[52] U.S. Cl. .............................. 74/602; 15/250.16; 74/45; 74/51; 74/600
[58] Field of Search .................... 74/45, 51, 75, 74/595, 600, 601, 602; 15/250.13, 250.16, 250.17, 250.19

[56] References Cited

U.S. PATENT DOCUMENTS

| | | | |
|---|---|---|---|
| 2,753,721 | 7/1956 | Latta | 15/250.17 X |
| 3,242,520 | 3/1966 | Carroll et al. | 15/250.17 |
| 3,808,629 | 5/1974 | Druseikis | 15/250.17 |
| 4,559,845 | 12/1985 | Fallows | 15/250.16 X |
| 4,597,129 | 7/1986 | Eustache et al. | 15/250.16 |
| 4,610,046 | 9/1986 | Buschur et al. | 15/250.16 |
| 4,637,091 | 1/1987 | Wu | 15/250.16 X |
| 4,672,709 | 6/1987 | Licata et al. | 15/250.21 X |
| 4,794,818 | 1/1989 | Eustache et al. | 15/250.16 X |
| 5,264,766 | 11/1993 | Tracht et al. | 15/250.16 X |

*Primary Examiner*—Allan D. Herrmann
*Attorney, Agent, or Firm*—Dykema Gossett

[57] ABSTRACT

A variable length crank arm in a windshield wiper system provides a depressed park position for an associated wiper blade when the direction of rotation of a drive motor is reversed. The crank arm relies on an eccentric driver to vary its length between a first length and a longer second length. When the eccentric driver is rotated in a first direction to wipe the windshield, a spring loaded pin keeps the eccentric driver rotatably fixed to an output arm with the crank arm consequently at the first length. The spring loaded pin also engages a cam slot in a cam plate, the cam plate rotating freely with the output arm and the eccentric driver in the first direction. To move the blade to the depressed park position, the direction of rotation of the drive motor is reversed. This causes the cam plate to become rotatably stopped, with the now stationary cam slot forcing the pin out of engagement with the output arm. Continued reverse motor rotation rotates the eccentric driver relative to the output arm increasing the length of the crank arm, moving the blade to the depressed park position.

8 Claims, 3 Drawing Sheets 5,465,636

DEPRESSED PARK WINDSHIELD WIPER MECHANISM

This is a continuation of application Ser. No. 08/088,465 filed on Jul. 7, 1993, now U.S. Pat. No. 5,388,482.

TECHNICAL FIELD

This invention relates to the field of windshield wipers for motor vehicles. More particularly, it relates to depressed park mechanisms which move a windshield wiper blade to a park position below an inner wipe position of the blade.

BACKGROUND OF THE INVENTION

In typical automotive windshield wiper systems of the type having a reciprocating drive link between a wiper arm and a motor driven crank arm, the wiper arm moves a blade through an arcuate wipe pattern between fixed inner and outer positions as the crank arm rotates continuously in one direction. According to numerous prior proposals, the wiper blade may be moved to a park position below the wipe pattern by increasing the length, or throw, of the crank arm during the final stroke of the wiper blade. In so called reverse-to-park depressed systems, the extra angular movement of the wiper blade beyond the inner wipe position is produced by a mechanism in the wiper drive system which automatically increases the length of the crank arm in response to the onset of reverse rotation of the wiper drive shaft.

In several such systems, an eccentric drive is arranged within the crank arm between the drive motor and the drive link. The crank arm maintains a folded or drive position when the motor shaft rotates in a first direction resulting in normal wiping of the windshield. When the direction of drive shaft rotation is reversed to a second direction of rotation, the eccentric drive automatically extends the crank arm to a park position. A crank arm, according to this invention, represents an improved variable length crank arm employing an eccentric drive.

SUMMARY OF THE INVENTION

This invention is a new and improved variable length crank arm for windshield wiper systems. The windshield wiper system includes a windshield wiper arm pivotable on the vehicle body about a pivot axis, a lower arm fixed relative to the wiper arm at a first end for pivoting the wiper arm, a drive link having a first end pivotally connected to a second end of the lower arm, and an electric motor drive having a drive shaft rotatable about a drive axis in a first direction and an opposite second direction.

The new and improved crank arm includes an output arm with a first end and a second end which is pivotally connected to a second end of the drive link. An eccentric driver is rigidly attached to the drive shaft for unitary rotation therewith. The first end of the output arm is connected with the eccentric driver for rotation therebetween about an eccentric axis parallel to and offset from the drive axis. The rotation of the output arm to the eccentric driver is between a drive position producing a first crank arm length relative to the drive axis, and a park position producing a second crank arm length which is longer than the first crank arm length and corresponds to a parked position of the wiper arm.

Coupling means between the eccentric driver and the output arm rotatably fix the eccentric driver to the output arm in the drive position and sustain loads in both the first direction and the second direction when the drive shaft rotates in the first direction. The coupling means are releasable to permit relative rotation between the eccentric driver and the output arm about the eccentric axis. Cam means between the coupling means and the vehicle body operate in response to rotation of the drive shaft in the second direction, releasing the coupling means so that continued drive shaft rotation in the second direction causes the eccentric driver to rotate relative to the output arm from the drive position to the park position.

DESCRIPTION OF THE PREFERRED EMBODIMENT

Figure 1:
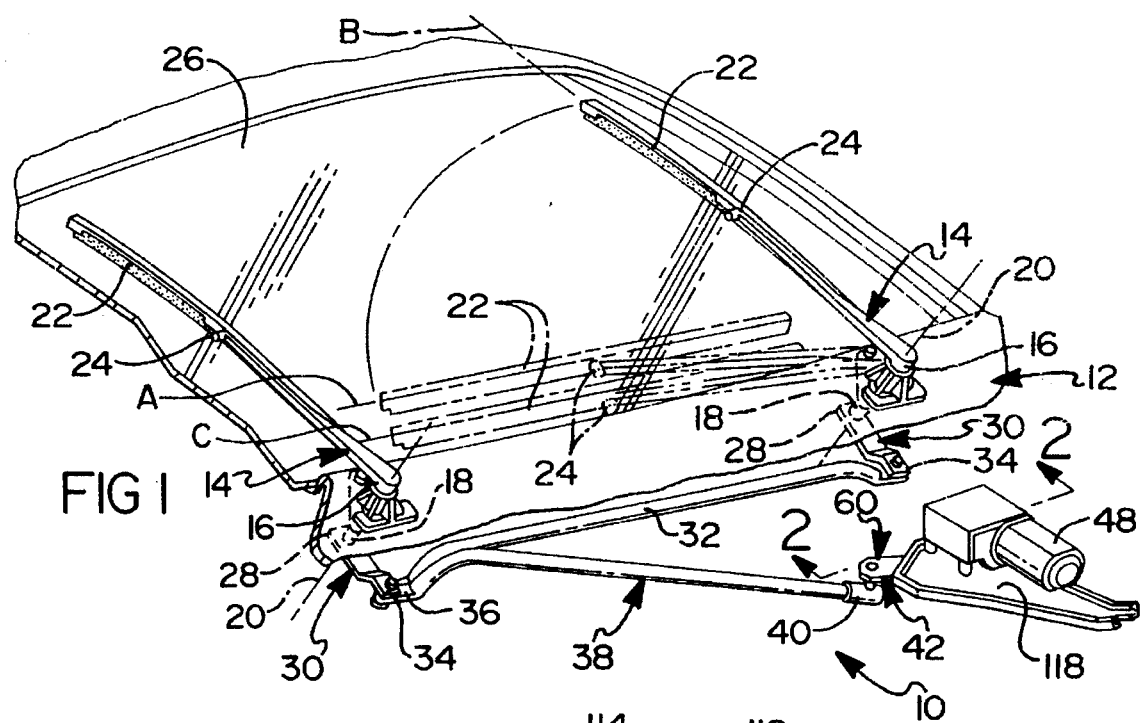
FIG. 1 is a cut-away view of a windshield wiper system installed in a vehicle.
Figure 6:
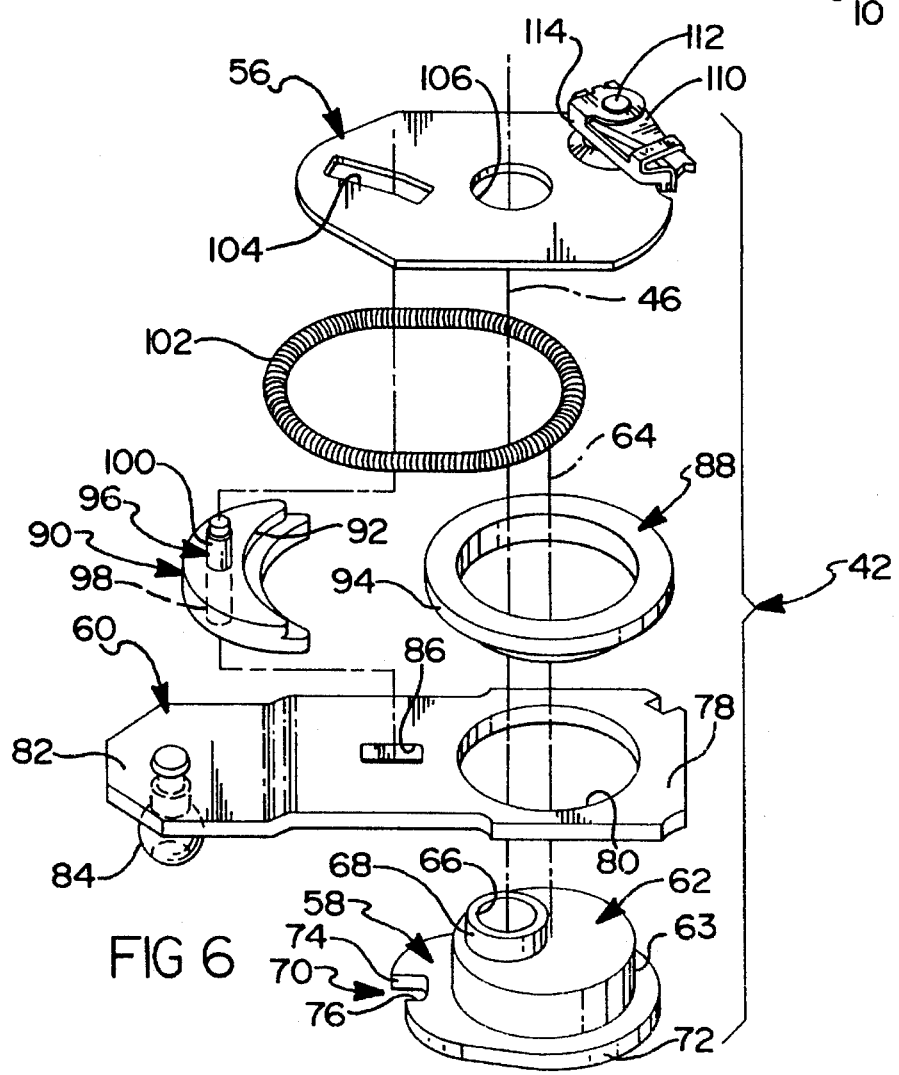
FIG. 6 is an exploded view of the crank arm.

FIG. 1 shows a windshield wiper system 10 on a vehicle body 12 with a pair of wiper arms 14. Each wiper arm 14 has a first end 16 fixed to a pivot shaft 18. The pivot shaft 18 is rotatably mounted to the vehicle body 12 and defines a pivot axis 20 about which the wiper arm 14 rotates. The wiper arm 14 has a blade 22 disposed at a second end 24 for reciprocation across a windshield 26 between an inner wipe position A and an outer wipe position B.

Each pivot shaft 18 has a first end 28 of a lower arm 30 fixed to it. An operating link 32 connects a second end 34 of both lower arms 30. Pivotally connected to the second end 34 of one of the lower arms 30 is a first end 36 of a drive link 38. A second end 40 of the drive link 38 is pivotally connected to a variable length crank arm 42.

Figure 3:
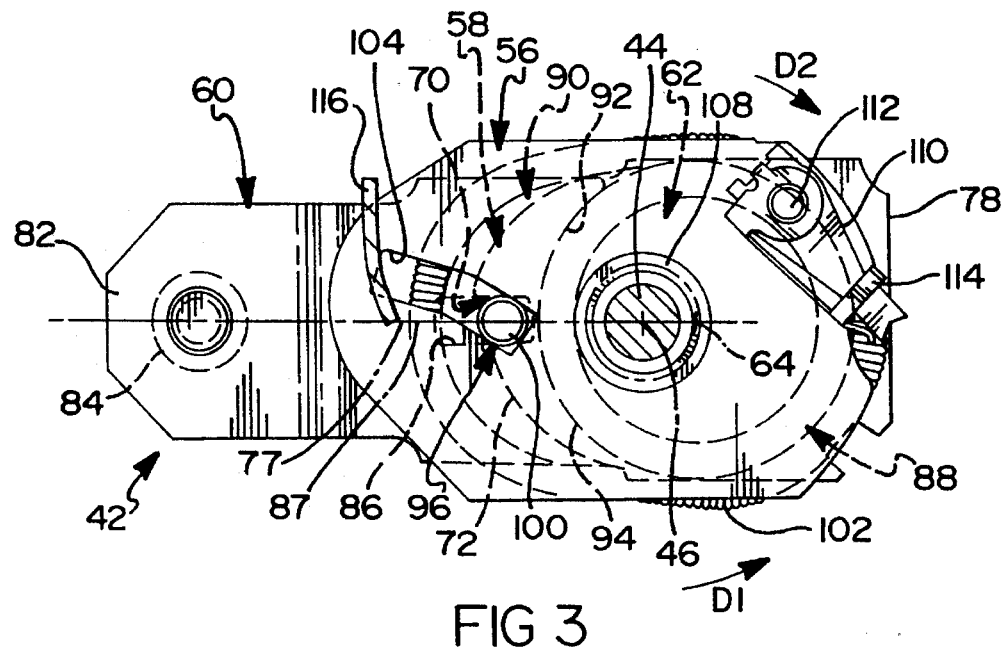
FIG. 3 is a view of the crank arm in the drive position taken in the direction of arrows 3—3 of FIG. 2.

The variable length crank arm 42, according to this invention, is fixed to a drive shaft 44 for rotation about a drive axis 46. The drive shaft 44 is drivingly connected to a bi-directional electric motor 48 by a worm 50 and worm gear 52 combination. The worm 50 is fixed to a motor output shaft 54 and drives the worm gear 52 which is fixed to the drive shaft 44. The motor 48 can rotate the drive shaft 44 about the drive axis 46 in both a first direction D1 and an opposite second direction D2, as shown in FIG. 3.

The variable length crank arm 42 comprises, in its three largest parts, a cam plate 56, an eccentric driver 58 and an output arm 60. All are substantially flat, with one disposed on top of the other to make the variable length crank arm 42 very compact in size.

A boss 62 projecting from the eccentric driver 58 defines a connecting means having an annular surface 63 centered on an eccentric axis 64. The eccentric driver 58 has a bore 66 which receives the drive shaft 44 for rigid attachment of the shaft to the eccentric driver 58. An annular flange 68 around the bore 66 projects out from the boss 62.

A notch 70 defines a formation in a perimeter 72 of the eccentric driver 58 having a first side 74 longer than a second side 76. The notch 70 is centered on a notch axis 77 passing from the eccentric axis 64 through the drive axis 46. The first side 74 is parallel with the notch axis 77. The second side 76 is at a 15 degree angle to the notch axis 77.

Figure 4:
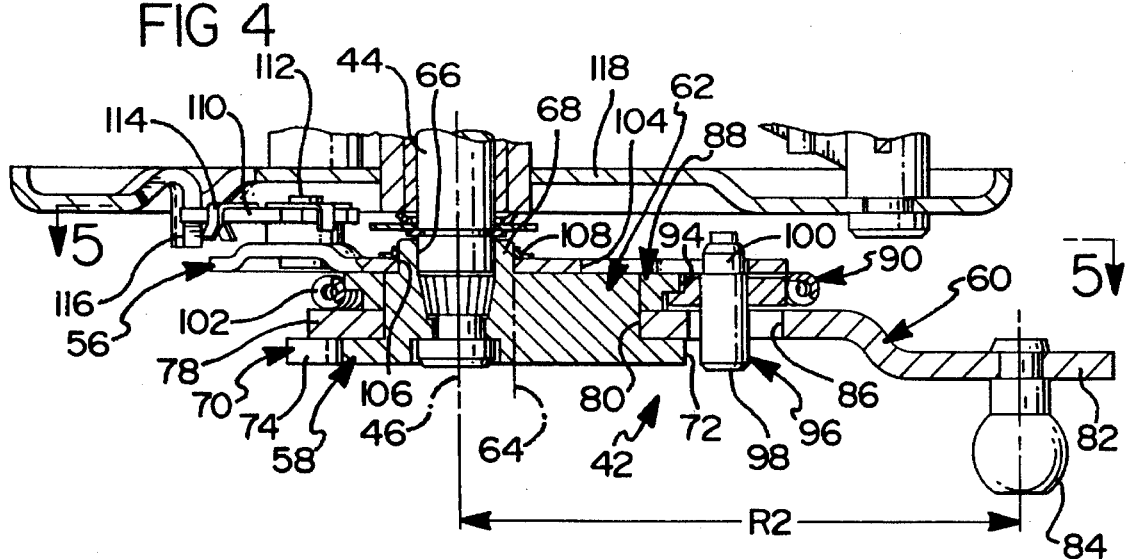
FIG. 4 is a sectional side view of the windshield wiper crank arm in a park position.
Figure 5:
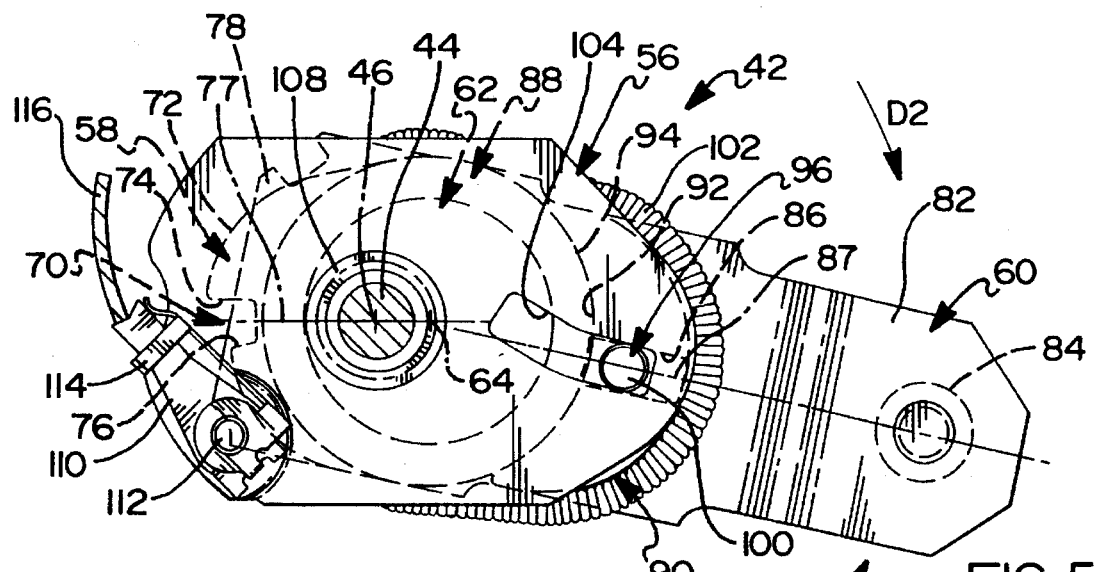
FIG. 5 is a view of the crank arm in the park position taken in the direction of arrows 5—5 of FIG. 4.

The output arm 60 has a first end 78 with an aperture 80 and a second end 82 with a ball stud 84. The aperture 80 receives the boss 62 on the eccentric driver 58, whereby the output arm 60 is rotatable relative to the eccentric driver 58 about the eccentric axis 64 between a folded or drive position, shown in FIG. 2 and FIG. 3, and an extended or park position, shown in FIG. 4 and FIG. 5.

The folded crank arm has a first crank arm length R1 between the drive axis 46 and the ball stud 84. The extended arm has a second crank arm length R2 between the drive axis 46 and the ball stud 84. The ball stud 84 on the second end 82 of the output arm 60 provides a pivoting attachment to a complementary socket (not shown) on the second end 40 of the drive link 38. A slot 86 in the output arm 60 is centered on a slot axis 87 passing through the ball stud 84 and the eccentric axis 64.

A collar 88 is pressed over and flush with the boss 62 to retain the output arm 60 to the eccentric driver 58.

A crescent-shaped pin plate 90 is slidably disposed on the output arm 60 with a concave surface 92 thereof slidably engaging an outside surface 94 of the collar 88. An engagement or drive pin 96, rigidly attached to the pin plate 90, has a first end 98 extending through the slot 86 in the output arm 60 and into the notch 70 in the eccentric driver 58, and a second end 100 projecting in the opposite direction. A band spring 102 is disposed around the collar 88 and the pin plate 90 and biases the pin plate 90 and the pin 96 toward the eccentric axis 64.

The cam plate 56 has a cam slot 104 and an aperture 106 therein. The aperture 106 fits over the flange 68 on the eccentric driver 58 so that the cam plate 56 is rotatable relative to the eccentric driver 58 about the drive axis 46. The cam plate 56 is retained on the flange 68 by a clip 108. The second end 100 of the pin 96 is slidably disposed in the cam slot 104.

A lever or latch 110 is supported on a post 112 on the cam plate 56 for pivotal movement relative to the latter in a plane parallel to the plane of the cam plate 56 against the bias of a latch spring 114. The latch 110 acts as one-way brake means for eliminating rotative movement of the cam plate 56 when the eccentric driver 58 is rotated in the second direction D2.

This variable length crank arm 42 is dependent for its operation on an electronic control system (not shown) which is well known in the art. Such a control system is described in U.S. patent application No. 07/942,920, filed Sep. 10, 1992, now U.S. Pat. No. 5,264,766 assigned to the assignee of the present invention. The control system enables both dynamic braking of the windshield wiper system 10 with the electric motor 48 as well as reverse drive of the electric motor 48. The electronic control system includes a wiper switch selectively moveable by the vehicle operator between a run position and an off position.

The crank arm 42 operates as follows. When the wiper switch is in a run position, the motor 48 drives the drive shaft 44 in the first direction D1 of rotation with the crank arm 42 and the drive link 38 cooperating to reciprocate the blade 22 between the inner wipe and outer wipe positions A and B. The operating link 32 causes the wiper arms 14 and the blades 22 to move in parallel.

With the drive shaft 44 being rotated in the first direction D1, the variable length crank arm 42 is maintained at length R1. The output arm 60 and eccentric driver 58 are fixed in the drive position with the pin 96 disposed in the notch 70 of the eccentric driver 58. The latch spring 114 deflects to allow the latch 110 to overrun a stop 116 on a bracket 118 fixed to the vehicle body 12.

Figure 2:
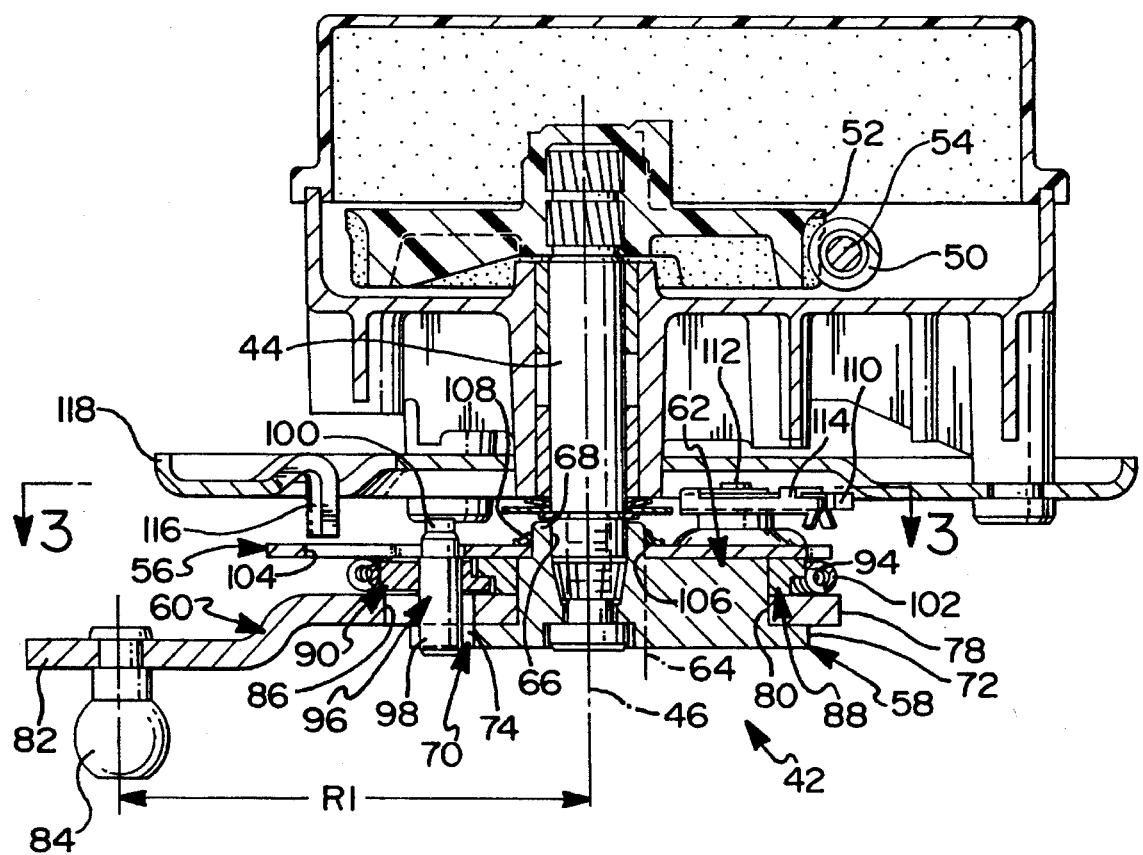
FIG. 2 is a sectional side view of an electric motor drive and a windshield wiper crank arm in a drive position.
Figure 7:
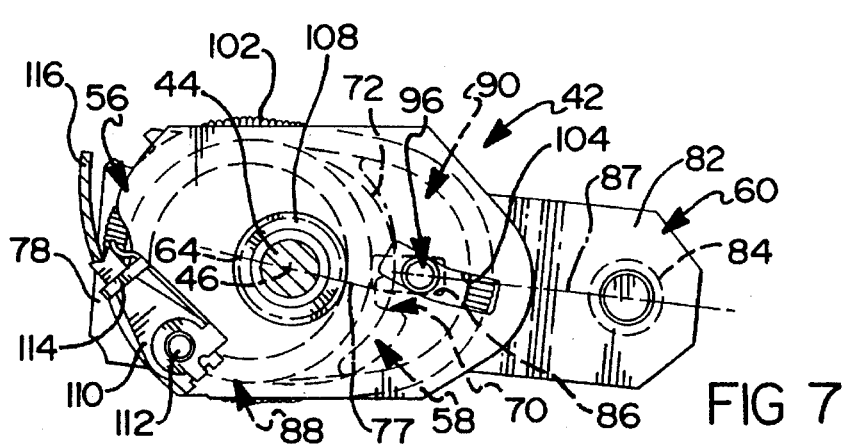
FIG. 7 is an axial view of the crank arm with a pin in a free position.

The notch 70, the slot 86 and the pin 96 define a releasable coupling between the eccentric driver 58 and the output arm 60. The pin 96 acts as a coupler moving between an engaged position in which it is disposed in the notch 70, as shown in FIG. 2 and FIG. 3, and a free position outside of the notch 70, as shown in FIG. 7.

This coupling between the output arm 60 and the eccentric driver 58 is able to sustain torsional loads against the crank arm 42 in both the first and second rotative directions while the crank arm 42 is being rotated in the first direction D1. This is particularly beneficial when the windshield wiper system 10 is operated at high wipe speeds, where a rotative inertia of the wiper blade 22 and arm 14 about the pivot axis 20 can produce a reversal of the torsional load on the crank arm 42 at the outer wipe position B. The improved engagement provided by this invention thus assures continuous engagement of the eccentric driver 58 with the output arm 60 during wiping.

To stop the wiper blade 22, the wiper switch is moved to the off position. The electronic control allows the wiper blade 22 to return to the inner wipe position A, where an inner wipe position indicating switch, not shown, causes the motor 48 to dynamically brake the wiper system 10 to a halt. The electronic control then reverses the motor 48, causing the drive shaft 44 to rotate in the second direction D2.

Rotation in the second direction D2 causes the latch 110 on the cam plate 56 to engage the aforesaid stop 116. This eliminates rotative movement of the cam plate 56 relative to the vehicle body 12, while the drive shaft 44 continues to apply torque on the eccentric driver 58 in the second direction.

This torque on the eccentric driver 58 is initially resisted by the side of cam slot 104 in the cam plate 56 through the engagement pin 96 and the second side 76 of the notch 70. The inclination of the cam slot 104, however, causes a force reaction on the pin 96 which lifts the pin 96 out of the notch 70 against the band spring 102. Thereafter, the eccentric driver 58 is rotatable relative to the cam plate 56 and to the output arm 60 which is prevented from rotating by the second end 100 of the pin 96.

With continued rotation of the eccentric driver 58 relative to the output arm 60, the length of the crank arm 42 is increased. This continues until the crank arm 42 is at length R2 and the blades 22 have been moved to a park position C below the inner wipe position A. At this point, a park position indicating switch, not shown, turns the motor off.

When the wiper switch is set to the run position, the motor 48 rotates the drive shaft 44 in the first direction D1, while the output arm 60 is stalled by the frictional resistance of the wiper blades 22 against the windshield 26. The eccentric driver 58 rotates in the first direction D1 relative to the output arm 60 causing the crank arm 42 to become shorter, moving the wiper blades 22 from the park position C toward the inner wipe position A. At registry between the first end 98 of the pin 96 and the notch 70, the band spring 102 seats the pin 96 in the notch 70 to unite the output arm 60, the eccentric driver 58 and cam plate 56 for unitary rotation in the first direction D1 as described above.

It should be appreciated that because the assembled crank arm 42 is very compact in size, it can be used in place of a crank arm of fixed length. This allows assembly of wiper systems both with and without the depressed park feature on a single wiper system assembly line.

The embodiments to which an exclusive property or privilege is claimed are defined as follows:

1. In a windshield wiper system on a vehicle body including a windshield wiper arm pivotable on the vehicle body about a pivot axis, a lower arm fixed relative to the wiper arm at a first end for pivoting the wiper arm, a drive link having a first end pivotally connected to a second end of the lower arm, and an electric motor drive having a drive shaft rotatable about a drive axis in a first direction and an opposite second direction, a variable length crank arm comprising:

an eccentric driver fixed to the drive shaft for unitary rotation therewith and defining a first annular surface eccentric to the drive shaft and defining a notch in a perimeter of the eccentric driver;

an output arm having a first end defining a second annular surface rotatably engaging the first annular surface of the eccentric driver and having a pivot member at a second end pivotally connected to a second end of the drive link wherein relative rotation between the output arm and the eccentric driver changes a distance between the drive axis and the pivot member from a first length associated with a folded position and a longer second length associated with an extended position;

an engaging member rotating with the output arm operably engaging the notch in the eccentric driver to hold the output arm in the folded position when the drive shaft is rotated in the first direction;

a spring functionally disposed between the engaging member and the eccentric driver, biasing the engaging member towards the perimeter of the eccentric driver; and a cam member rotatably mounted on the drive shaft axis and rotatable thereabout relative to the eccentric driver and the output arm, having a cam surface operably engaging the engaging member when both the cam member is fixed relative to the body and the eccentric driver is rotated by the drive shaft in the second direction wherein continuing rotation of the drive shaft in the second direction forces the engaging member along the cam surface thereby lifting the engaging member out of the notch to rotatively free the eccentric driver from the output arm, with yet further rotation of the drive shaft in the second direction extending the crank arm to the extended length.

2. A variable length crank arm as described in claim 1, wherein an anti-rotation mechanism is disposed between the cam member and the vehicle body operative to rotatively engage the cam plate with the vehicle body in response to rotation of the drive shaft in the second direction.

3. A variable length crank arm as described in claim 2, wherein the anti-rotation mechanism is a one way brake permitting rotation in the first direction and restricting it in the second direction.

4. A variable length crank arm as described in claim 1, wherein the cam member is a cam plate with a cam slot and the engaging member is a pin engaging the cam slot.

5. A variable length crank as described in claim 1, wherein a one way brake is disposed between the cam member and the vehicle body and is configured to rotatively engage the cam plate with the vehicle body in response to rotation of the drive shaft in the second direction.

6. A variable length crank arm as described in claim 1, wherein the engaging mechanism includes a pin disposed in a pin plate with a first end disposed in a slot in the output arm and a second end slidably disposed against the cam surface.

7. A variable length crank arm as described in claim 1, wherein the cam surface is provided by a slot in the cam plate.

8. A variable length crank arm as described in claim 6, wherein the cam surface is provided by a slot in the cam plate.

* * * * *